United States Patent [19]
Acre

[11] 4,109,350
[45] Aug. 29, 1978

[54] CLAMP BAND

[75] Inventor: Leon R. Acre, Ovid, Mich.

[73] Assignee: Midland-Ross Corporation, Cleveland, Ohio

[21] Appl. No.: 730,671

[22] Filed: Oct. 7, 1976

[51] Int. Cl.² .............................................. A44B 21/00
[52] U.S. Cl. ............................ 24/249 LS; 24/20 EE; 24/201 HH; 24/284; 285/367; 403/344
[58] Field of Search .............. 24/201 R, 201 HH, 285, 24/20 EE, 284, 249 LS; 285/367, 373, 410, 419, 420; 403/344; 92/98 R

[56] References Cited
U.S. PATENT DOCUMENTS

| 200,644 | 2/1878 | Cook | 24/20 EE |
|---|---|---|---|
| 1,047,376 | 12/1912 | Brynteson | 24/20 EE |
| 3,023,036 | 2/1962 | Taylor, Jr. | 403/344 |
| 3,141,208 | 7/1964 | Stradella | 24/20 EE |
| 3,464,722 | 9/1969 | Larkin | 285/367 |
| 3,482,289 | 12/1969 | Stradella | 24/20 EE X |
| 3,483,800 | 12/1969 | Golden | 92/98 R |
| 3,964,773 | 6/1976 | Stade et al. | 285/367 |
| 3,974,741 | 8/1976 | Ohmi | 92/98 R |

Primary Examiner—Werner H. Schroeder
Assistant Examiner—Moshe I. Cohen
Attorney, Agent, or Firm—H. Duane Switzer

[57] ABSTRACT

A generally circular clamp band assembled from a pair of identical clamp band members each having an integral connection formed at one end for cooperation with a like connection on the like member to join a pair of members at one end without the use of additional fasteners.

1 Claim, 7 Drawing Figures

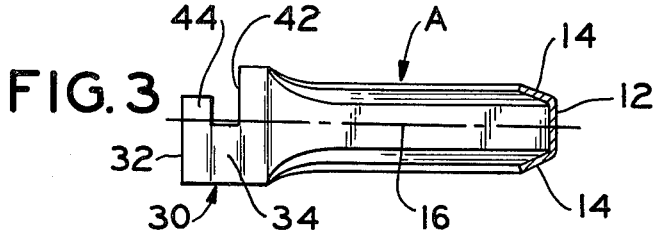
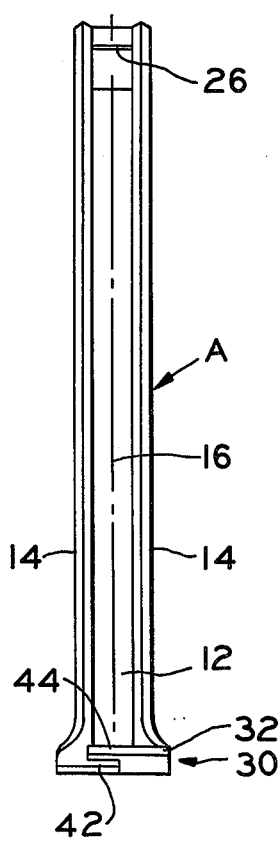
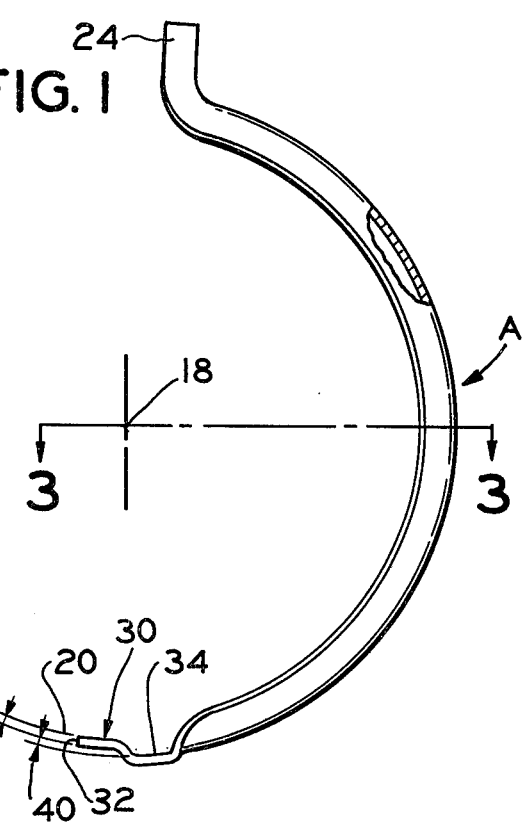
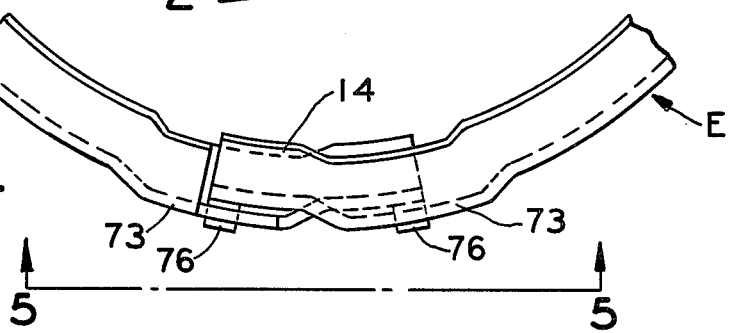
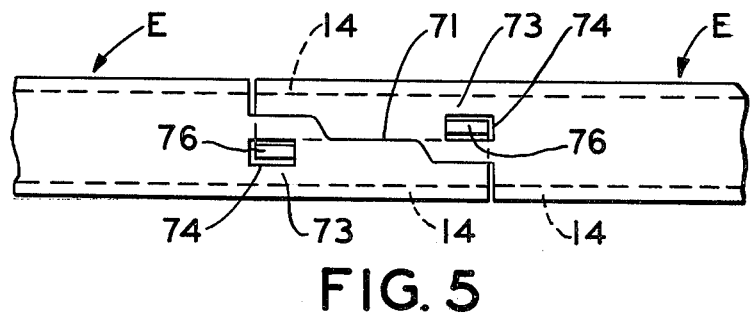

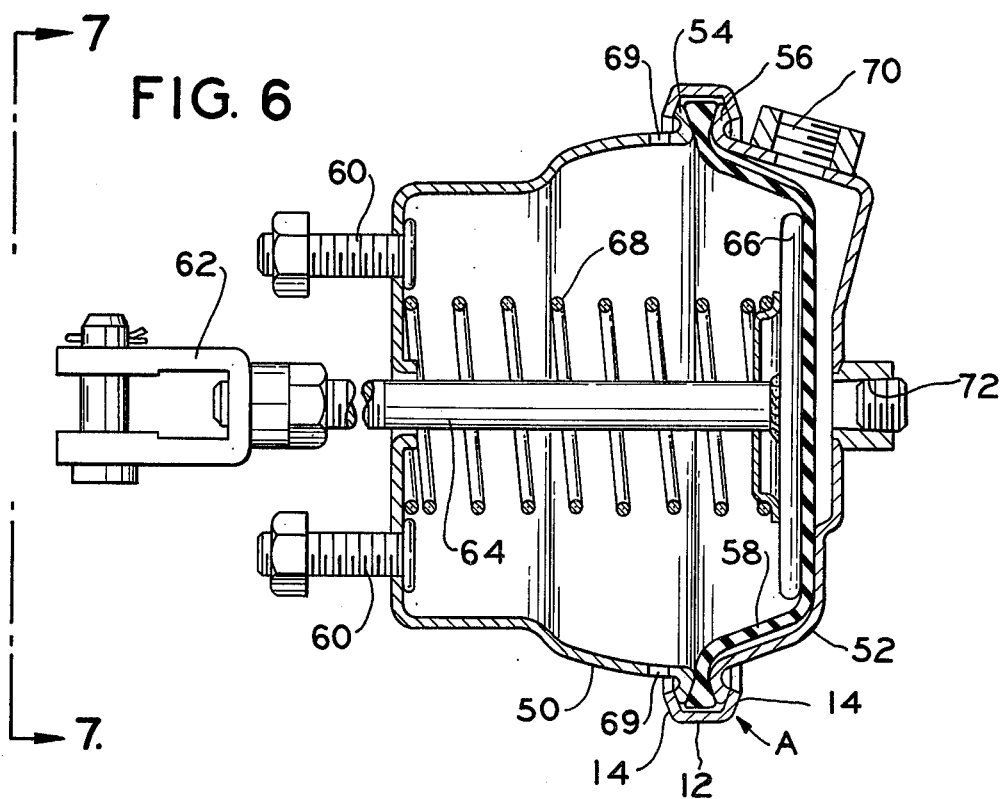
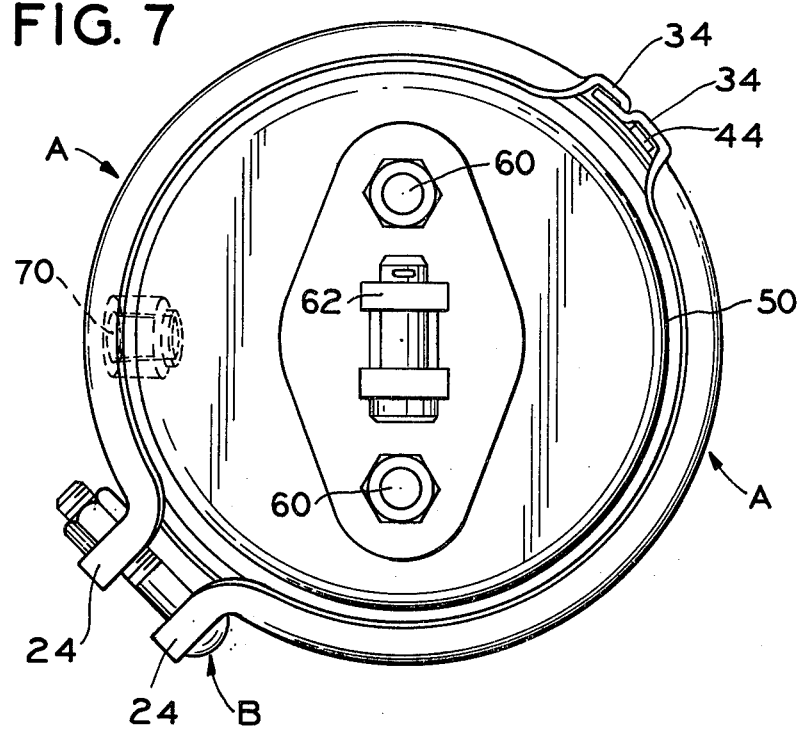

CLAMP BAND

BACKGROUND OF THE INVENTION

This application pertains to the art of clamp bands and, more particularly, to clamp bands for joints on pressure vessels or the like. The invention is particularly applicable for use in joining a pair of members which form a pressure vessel used in a vehicle brake system and will be particularly described with reference thereto. However, it will be appreciated that the invention has broader aspects and may be used in other environments.

Generally circular clamp bands are commonly formed from a pair of generally C-shaped members which are connected together at their opposite ends. Many clamp bands of this type require separate fasteners to connect the clamp band parts at both of the opposite ends thereof. In certain clamp bands, the parts are integrally formed at one end for connection with one another without requiring the use of a separate fastener. However, the two clamp band parts are not formed at the one end with identical integral connections so that the manufacture, storage and assembly of two different parts is still required. It would be desirable to have a clamp band which could be assembled from two identical members and which required the use of only one adjustable fastener for tightening the clamp band.

SUMMARY OF THE INVENTION

A generally circular clamp band formed from a pair of identical generally C-shaped clamp band members. Each member is formed at one end with an integral interdigitating connecting means for cooperation with a like connecting means on a like member to connect a pair of the members at one end without requiring the use of a separate fastener and without requiring deformation of the material from which the members are made.

Each clamp band member has a generally U-shaped cross-sectional configuration, and includes a bottom inside surface extending longitudinally of the member and lying on the periphery of a reference circle. Connection of the two clamp band members with the interdigitating connecting means forms a generally circular clamp band with the bottom inside surfaces of the two members lying generally on the periphery of the same reference circle, and with no protuberances extending inwardly of the periphery of that reference circle.

The end portion of the clamp band member on which the interdigitating connecting means is formed preferably is flattened and has a width substantially greater than the width between the free ends of the legs on that portion having a U-shaped cross section. In one arrangement, the legs are deformed downwardly to lie in a common plane with the base portion at the flattened end portion.

In one arrangement, the clamp band member has a longitudinal axis and a flat end portion has a terminal end, and the interdigitating connecting means includes a transverse offset portion spaced inwardly from the terminal end. The offset portion is deformed outwardly to have its inside surface located outwardly of the periphery of the reference circle a distance at least as great as the thickness of the material from which the clamp band member is formed. A slot is provided in the offset portion extending inwardly from one side edge of the flat end portion at least to the longitudinal centerline of the clamp band member.

In a preferred arrangement, the offset portion at the flat end portion has its inside surface located outwardly of the periphery of the reference circle a distance slightly greater than the thickness of the material from which the clamp band member is formed. This provides some clearance to prevent any protuberances on the clamp band members extending inwardly of the periphery of the reference circle.

The slot in the offset portion preferably extends inwardly slightly beyond the longitudinal centerline thereof. This provides sufficient clearance to insure that the centerlines of the two clamp band members can be aligned with one another.

The flat end portion of the clamp band member extending from the slot in the offset portion to the terminal end thereof defines a tongue which preferably has a length substantially less than the length of the slot. Cutting off the tongue in this manner still provides a strong interdigitated connection without having any problem with a long tongue which might be bent and create interference with proper assembly of two clamp band members.

It is a principal object of the present invention to provide an improved clamp band member assembled from a pair of identical parts.

It is also an object of the present invention to provide a clamp band member formed from a pair of identical parts formed integrally at one end with interdigitating connecting means.

It is a further object of the invention to provide an improved two-piece clamp band member having an integral connection at one end which can be used many times because it does not require deformation of the material from which the clamp band is formed.

BRIEF DESCRIPTION OF THE DRAWING

FIG. 1 is a side elevational view of a clamp band member constructed in accordance with the present invention;

FIG. 2 is an elevational view taken generally on line 2—2 of FIG. 1;

FIG. 3 is a partial cross-sectional plan view taken generally on line 3—3 of FIG. 1;

FIG. 4 is a partial side elevational view of another form of connection;

FIG. 5 is a bottom view taken generally on line 5—5 of FIG. 4;

FIG. 6 is a cross-sectional elevational view of a vehicle brake pressure chamber having the improved clamp band of the present application incorporated therein; and FIG. 7 is an end elevational view taken generally on line 7—7 of FIG. 6.

DESCRIPTION OF PREFERRED EMBODIMENTS

With reference to the drawing, a generally C-shaped clamp band member A has a generally U-shaped cross-sectional configuration including a substantially flat base 12 and opposite legs 14. Clamp band member A has a longitudinal axis 16 and the inner surface of base 12 is longitudinally curved to lie on the periphery of a reference circle whose center is indicated at 18 in FIG. 1. A portion of the periphery 20 of the reference circle is indicated at the bottom left of FIG. 1. Legs 14 extend from base 12 in a direction generally toward the center 18 of the reference circle. Legs 14 also diverge so that the inner leg surfaces slope inwardly toward one another in a direction proceeding from the free ends of the legs toward base 12.

One end portion of clamp band member A is bent outwardly as indicated generally at 24 to define an adjustable fastener end portion having a rectangular hole 26 through the base thereof for receiving an adjustable fastener. The opposite end portion 30 of clamp band member A is flat to define a flat end portion having a width perpendicular to longitudinal axis 16 which is substantially greater than the width of the remainder of clamp member A. More specifically, the width of flat end portion 30 is substantially greater than the distance across the free ends of legs 14. This is accomplished by flattening legs 14 at flat end portion 30 so they lie in a common plane with base 12.

Flat end portion 30 has a terminal end 32 and is formed with an offset portion 34 inwardly from terminal end 32. Offset portion 34 is offset or deformed outwardly relative to periphery 20 of the reference circle so that its inner surface lies outwardly of the periphery 20 of the reference circle by a distance at least as great as the thickness of the material from which clamp band member A is formed. This thickness is indicated generally between the arrows at 38 in FIG. 1. Preferably, the inner surface of offset portion 34 is spaced outwardly of the periphery of the reference circle by a distance slightly greater than the thickness of the material from which clamp band member A is formed as shown at 40 in FIG. 1. This provides some clearance to insure the absence of any projections extending inwardly of reference circle periphery 20 when a pair of clamp band members are assembled. A slot 42 is formed in flat end portion 30 and extends from one side edge thereof toward longitudinal axis 16. Slot 42 extends at least to longitudinal axis 16 and preferably slightly beyond such axis in order to provide sufficient clearance for insuring alignment of longitudinal axes 16 on a pair of assembled clamp band members. That portion of flat end portion 30 lying between slot 42 and terminal end 32 defines a tongue 44 which has a length substantially less than the length of slot 42. That is, slot 42 extends from one side edge of flat end portion 30 to the bottom thereof over a certain length and the length of tongue 44 from the bottom of slot 42 to the terminal end of the tongue is substantially less than the length of the slot. This shortened length for the tongue eliminates an unnecessary tongue length which may be bent or otherwise deformed to create interference when a pair of clamp band members are assembled. A tongue 44 on one clamp band member extends through a slot 42 on another clamp band member to form a connection between two clamp band members. The described arrangement of the slot and tongue on the flat end portion of a clamp band member provides an interdigitating connecting means for cooperation with a like connecting means on a like clamp band member.

When a pair of clamp band members are assembled together by having their interdigitating connecting means interdigitated with one another, the inner surfaces of the bases on each clamp member lie on the periphery of the same common reference circle and there are no protuberances extending inwardly of the periphery of this reference circle anywhere along the circumference of the clamp band. This is particularly insured at the integral connection by spacing the inner surface of offset portion 34 outwardly of the periphery of the reference circle by a distance slightly greater than the thickness of the material from which the clamp band member is made, and by shortening the length of tongue 44. Alignment of the longitudinal axes of the two clamp band members when assembled is insured by having the length of slot 42 extend slightly beyond longitudinal axis 16. The inner surface of tongue 44 and that portion of flat end portion 30 from which it extends lies on the periphery of the same reference circle as the inner surface of base 12.

A pair of clamp band members A are shown assembled in FIG. 7 with an adjustable fastener in the form of a nut and bolt assembly B cooperating with fastener receiving holes 26 in adjustable fastener end portions 24 to tightly clamp the clamp band around a joint. The clamp band formed by the two generally C-shaped clamp band members is generally circular and provides a very firm joint. The clamp band can be taken apart by removing adjustable fastener B without damaging the clamp band members because there is no deformation of the metal when making the connection at the integral connection ends.

FIGS. 6 and 7 show the clamp band being used to make a joint for a pressure vessel or the like defined by two parts 50 and 52 having openings with outwardly extending circumferential flanges 54 and 56 therearound. The periphery of a flexible diaphragm 58 is positioned between flanges 54 and 56. Members 50 and 52 are positioned generally with their openings aligned and with flanges 54 and 56 in opposed relationship to one another on opposite sides of the peripheral portion of diaphragm 58. The clamp band member formed by a pair of clamp band members A is positioned around the joint with flanges 54 and 56 received between legs 14. The sloping nature of the inner surfaces of legs 14 makes them cam surfaces so that tightening of adjustable fastener B to contract the clamp band causes firm engagement of the inner surfaces of legs 14 with flanges 54 and 56 to cam such flanges toward one another in firm gripping relationship with the periphery of diaphragm 58. Obviously, similar joints can be made in conduits and other pressure vessels if so desired.

The brake mechanism shown in FIG. 6 includes mounting studs 60 on part 50 and a clevis 62 on the end of rod 64 having a plate 66 bearing against diaphragm 58 under the action of a coil spring 68. Part 50 has a hole 69 opened to atmosphere. One of ports 70 or 72 is connected with a source of air pressure which is selectively admitted by operation of a valve into the closed chamber formed between diaphragm 58 and vessel part 52 for moving the diaphragm to the left in FIG. 6 against the force of spring 68 for extending rod 64.

FIGS. 4 and 5 show another arrangement wherein a pair of clamp band members E are shaped and formed generally the same as a clamp band member A except at the integral connecting end thereof. In the arrangement of FIGS. 4 and 5, the integral connecting end portion of each clamp band member E is longitudinally removed as indicated generally at 71 in FIG. 5. An offset portion 73 is formed in the same manner as offset portion 34 of clamp band member A. A slot in the form of a rectangular opening 74 is formed through the base at the offset portion 73 and an outwardly extending tongue 76 is formed outwardly of offset portion 73. The integral connecting end portions are interdigitated as shown in FIGS. 4 and 5 with the tongue 76 on one extending through the slot 74 on the other. The end portions having the integral interdigitating connecting means thereon are overlapped with one another to provide the integral connection by interdigitating the interdigitating means. In the arrangement of FIGS. 4 and 5, one of the legs 14 can remain on the integral connecting portion without being flattened if so desired.

Although the invention has been shown and described with reference to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. An arcuate clamp band member cooperable with a like member to form a generally circular clamp band, said member including a longitudinal centerline and having a generally U-shaped cross-sectional configuration and a bottom inside surface lying on the periphery of a reference circle, said U-shaped cross-sectional configuration being defined by a generally flat base portion having legs extending upwardly therefrom, said legs being deformed to lie in a common plane with said base portion at one end portion of said member to define a flat end portion having a terminal end and a width substantially greater than the width of the remainder of said member, said member being integrally formed with interdigitating connecting means for cooperating with corresponding interdigitating connecting means on said like member to form a generally circular clamp band with the bottom inside surfaces of the two members lying generally on the periphery of said reference circle, said interdigitating connecting means cooperating to interconnect the members against displacement along and radially of said reference circle, and including a transverse offset portion spaced inwardly from said terminal end, said offset portion being deformed outwardly to have its inside surface located outwardly of said reference circle a distance slightly greater than the thickness of the material from which said member is formed, a slot in said offset portion extending from one side edge of said flat end portion slightly beyond said longitudinal centerline, and said flat end portion from said slot to said terminal end defining a tongue and said tongue having a length perpendicular to said longitudinal center line which is substantially less than one-half the width of said flat end portion perpendicular to said longitudinal center line.

* * * * *